United States Patent [19]

Thomann et al.

[11] 4,227,084
[45] Oct. 7, 1980

[54] METHOD OF DETECTING HIGH ENERGY RADIATION VIA A BISMUTH OXIDE COMPOUND

[75] Inventors: Helmut Thomann, Munich; Christa Grabmaier, Kempfenhausen, both of Fed. Rep. of Germany

[73] Assignee: Siemens Aktiengesellschaft, Berlin & Munich, Fed. Rep. of Germany

[21] Appl. No.: 837,197

[22] Filed: Sep. 28, 1977

[30] Foreign Application Priority Data

Sep. 30, 1976 [DE] Fed. Rep. of Germany ....... 2644168

[51] Int. Cl.$^2$ .............................................. G01T 1/22
[52] U.S. Cl. ................................................... 250/370
[58] Field of Search ............... 250/320, 323, 472, 473, 250/474, 361, 362, 370

[56] References Cited

U.S. PATENT DOCUMENTS

| | | | |
|---|---|---|---|
| 3,864,725 | 2/1975 | Merrin | 357/31 |
| 4,065,671 | 12/1977 | Mayeux et al. | 250/370 |

FOREIGN PATENT DOCUMENTS 814193 9/1951 Fed. Rep. of Germany.

OTHER PUBLICATIONS

"Journal of Research of the National Bureau of Standards-A. Physics & Chemistry", vol. 68A, No. 2, Mar.-Apr., 1964, pp. 197-206.
"Journal of Crystal Growth" vol. 1, 1967, pp. 37-40.
Nestor et al., "Bismuth Germanate: A High-Z Gamma Ray and Charged Partide Detector" IEEE Transactions on Nuclear Science, vol. NS-22, Feb. 1975, pp. 68-71.
Cho et al., "Bismuth Germanate as a Potential Scintillation Detector in Positron Cameras," Journal of Nuclear Medicine/Instrumentation and Physics, vol. 18, No. 8, pp. 840-844.

Primary Examiner—Alfred E. Smith
Assistant Examiner—Janice A. Howell
Attorney, Agent, or Firm—Hill, Van Santen, Steadman, Chiara & Simpson

[57] ABSTRACT

X-rays or $\gamma$-rays are detected by irradiating a beam of high energy radiation onto a crystalline bismuth oxide compound having the formula $Bi_{10-14}X_1O_n$ wherein X is at least one element selected from the group consisting of Al, Ga, Ge, Si and Ti and n is a numeral substantially equal to the stoichiometric amount of oxygen within the compound. The above bismuth oxide crystalline compound may be placed in a radiation dosimeter or be applied as a radiation-sensitive coating on a cylinder or plate of an apparatus for producing electrostatic copies (i.e., an in a xerographic process or the like).

5 Claims, 1 Drawing Figure

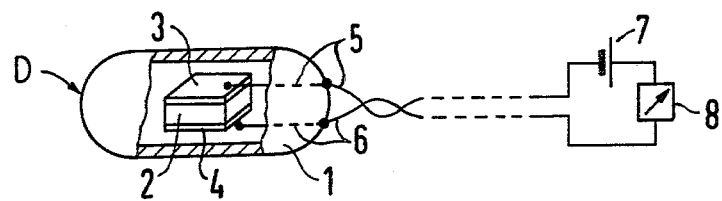

METHOD OF DETECTING HIGH ENERGY RADIATION VIA A BISMUTH OXIDE COMPOUND

BACKGROUND OF THE INVENTION

1. Field of the Invention

The invention relates to a novel method of detecting certain radiant energy, such as X-rays or γ-rays and somewhat more particularly to a method of detecting such energy via a crystalline bismuth oxide compound.

2. Prior Art

Bismuth oxide compounds containing small amounts of other oxide additives are known, for example, from "Journal of Research of the National Bureau of Standards-A. Physics and Chemistry", Vol. 28A, No. 2, March-April 1964, pages 197-206. This publication discloses processes for preparing various bismuth oxide compounds.

Further, $Bi_{12}GeO_{20}$ and $Bi_{12}SiO_{20}$ monocrystals have been grown for a considerable length of time since these monocrystals have good piezoelectric properties. It has also been pointed out in "Journal of Crystal Growth", Vol. 1, 1967, pages 37-40, that the bismuth oxide monocrystals have photoconductivity properties (which can be easily seen from the color of the monocrystals) in the wavelength range of about 0.5 to 7μm, with the usual drop in sensitivity for the photoconductivity effect with shorter wavelengths.

SUMMARY OF THE INVENTION

The invention provides a method of detecting X-rays, γ-rays and other like radiant energy via per se known bismuth oxide compounds having the formula $Bi_{10-14}X_tO_n$ wherein X is at least one element selected from the group consisting of Al, Ga, Ge, Si and Ti and n is a numeral substantially equal to the stoichiometric amount of oxygen within the compound. The foregoing bismuth oxide compounds may be produced as monocrystals and incorporated within a radiation dosimeter. In other embodiments of the invention, the foregoing bismuth oxide compounds may be utilized in a polycrystalline or sintered form as a layer on a plate or cylinder in a xerographic process for producing electrostatic copies of an electrically charged image.

BRIEF DESCRIPTION OF THE DRAWINGS

FIG. 1 is a somewhat schematic view, partially broken away, of an embodiment of a radiation dosimeter useful in the practice of the invention.

DESCRIPTION OF THE PREFERRED EMBODIMENTS

The invention provides a novel method of detecting relatively high energy radiation, such as X-rays, γ-rays and other like short wavelength radiant energy.

In accordance with the principles of the invention, X-rays, γ-rays and other like radiant energy is detected by irradiating a beam of such radiant energy onto a crystalline bismuth oxide compound having the formula:

$$Bi_{10-14}X_tO_n$$

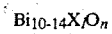

wherein X is at least one element selected from the group consisting of Al, Ga, Ge, Si and Ti and n is a numeral substantially equal to the stoichiometric oxygen content of the compound.

In accordance with the principles of the invention, bismuth oxide compounds having the foregoing formulation are utilized to detect radiant energy in a wavelength range which is entirely distinct and different from those utilized in producing photoconductivity.

A feature of the invention that is particularly striking is the extremely high quantum yield occurring; for example, with an X-ray wavelength range of X-radiation at around 78 kV and at a given exposure of 8.5 mR, filtered through a 4 mm aluminum plate and a 6 mm copper plate, we obtained, in an exemplary embodiment of the invention, a quantum yield having a value of 3000 with a monocrystalline specimen of the above bismuth oxide compound. It was established that the energy absorption in the above exemplary embodiment amounted to 67% for a 0.3 mm thick specimen of the above bismuth oxide compound.

The electrical conductivity of the above described bismuth oxide compounds, which occur during irradiation thereof with X-rays and/or γ-rays, lies in the range which is technically favorable for handling. The dark resistance, which must be considered in contrast and which is about $10^{12}$ to $10^{14}$ ohm. cm, is likewise extremely favorable and yields dark drop times (i.e., the amount of time required to drop an electrical charge to $e^{-1}$) in the order of more than 7 minutes. In this regard, it should be noted that the dark drop times, which may, in fact, be greater than 7 minutes, depends considerably on any preliminary treatment and any preliminary coating associated with the crystalline bismuth oxide compound above described. For example, dark drop times of up to 4 hours have been measured. In such instances, a preceding exposure to light appears to have substantial influence on the length of the dark drop time obtained. Further, electrodes arranged on a body or crystal composed of the above described bismuth oxide compounds also influences properties of such a crystal. Considered on the whole, however, omitting such steps provide no meaningful disadvantages to the method of the invention because the minimum dark drop times achieved are sufficient high values in praxis.

In preferred embodiments of the invention, crystals of the above described bismuth oxide compounds are utilized to detect X-rays and/or γ-rays via X-ray and/or γ-ray dosimeters and/or in X-ray xerographic processes. The term "xerography" is already in general use and is understood as comprising a process producing at least one copy of an electrostatically charged image on a foil or carrier, i.e., a sheet of paper. X-ray xerography in the context of the invention refers to a xerographic process utilizing X-rays to photostat an original object irradiated with X-rays.

In general terms, the invention provides a method of detecting relatively high energy radiation by irradiating a beam of X-rays, γ-rays or other relatively short wavelength radiation onto a crystalline bismuth oxide compound having the above described formula and then sensing such radiation.

In one exemplary embodiment of the invention, a body, such as a monocrystal composed of the above described bismuth oxide compound is suitably charged with an electrical field, irradiated with, for example, X-rays and any change in the electrical field is measured as a gauge of the intensity of the X-rays. In another exemplary embodiment of the invention, a body composed of the above described bismuth oxide compound is suitably charged with an electrical field; irradiated with, for example, X-rays; provided with a toner powder which adheres to the surface of the body in accordance with the charge image stored therein and a photostatic copy of such image is attained on a carrier. The charge on the body may be then removed to render it receptive for the repetition of this process.

Referring now to the drawings, an exemplary embodiment of a radiation dosimeter D is illustrated at FIG. 1 and comprises a sealed capsule or housing 1 having a monocrystalline body 2 therein. The body 2 is composed of a bismuth oxide compound having the formula:

$$Bi_{10-14}X_tO_n$$

wherein X is at least one element selected from the group consisting of Al, Ga, Ge, Si and Ti and n is a numeral substantially equal to the stoichiometric amount of oxygen within the compound. In an exemplary embodiment, the body 2 is composed of a $Bi_{12}GeO_{20}$ monocrystal and has surface dimensions of 5.5 mm along each side and a thickness of 0.3 mm between opposite sides thereof. A pair of electrodes 3 and 4 are mounted on opposing surfaces of body 2 as shown and electrical leads 5 and 6 are, respectively, operationally coupled to electrodes 3 and 4 and provide electrical communication between the body 2 and the exterior of capsule 1. A d.c. voltage source 7 and a current measuring means 8 are operationally coupled with the electrode via leads 5 and 6 in a conventional manner. The current measured by means 8 is a gauge of the radiation, i.e., X-rays, impinging on body 2. In order to obtain an integral gauge of the impinging radiation, means 8 may comprise a device having an integrating effect. Further, since the monocrystalline body 2 has relatively small dimensions, a radiation dosimeter may be constructed in accordance with the principles of the invention so as to have the above described bismuth oxide compound therein in a manner suitable for implantation or swallowing by a patient exposed to, for example, X-rays, so as to accurately measure and record the quantity of X-rays inside the body of the patient. Of course, in such an embodiment, the lead lines 5 and 6 must be of an appropriate length and suitable arrangememnts must be made for external support of the current source 7 and detecting means 8.

In another embodiment of the invention, the above described bismuth oxide compounds are utilized in the earlier described xerographic process for producing "copies" of an X-ray image. A number of processes are known which detach an original X-ray photograph via a film which is exposed to X-rays and subsequently developed and fixed. Apart from conventional X-ray screens which provide purely instantaneous observation, various types of X-ray image storage processes have been proposed. The invention provides an improved process for storing an X-ray image.

In accordance with the principles of the invention, X-ray images are stored by projecting an irradiation image which was previously produced by X-rays of an appropriate wavelength of a patient or a workpiece being investigated onto a plate positioned at the location of a normally positioned X-ray fluorescent screen. Such a plate, which may be a metal carrier, is provided with a layer composed of a crystalline bismuth oxide compound having the formula:

$$Bi_{10-14}X_tO_n$$

wherein X is at least one element selected from the group consisting of Al, Ga, Ge, Si and Ti and n is a numeral substantially equal to the stoichiometric amount of oxygen within the compound. In an exemplary working embodiment, a layer composed of $Bi_{12}GeO_{20}$ and having a thickness of 0.3 mm was utilized. A plate having a crystalline bismuth oxide compound layer of the type described thereon is somewhat analogous to the well known drum having a selenium coated outer surface.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim as our invention:

1. A dosimeter for detecting X-rays and γ-rays comprising:
    a hollow capsule having an X-ray and γ-ray—sensitive body therein;
    a pair of electrodes attached to opposite surfaces of said body;
    means providing an electrical charge operationally coupled to said electrodes; and
    means for sensing changes in the electrical charge on said body operationally coupled to said means for providing an electrical charge to said electrodes;
    said X-ray and γ-ray—sensitive body being composed of a crystalline bismuth oxide compound having the formula:

$$Bi_{10-14}X_tO_n$$

wherein X is at least one element selected from the group consisting of Al, Ga, Ge, Si and Ti and n is a numeral substantially equal to the stoichiometric amount of oxygen within the compound, said compound being γ-ray and X-ray photoconductive so that when said compound is irradiated by a γ-ray or a X-ray, such ray causes an electrical change to occur in the electrical conductivity of said body.

2. A dosimeter as defined in claim 1 wherein said crystalline bismuth oxide compound is in a monocrystalline form.

3. A dosimeter as defined in claim 1 wherein the crystalline bismuth oxide compound has the formula:

$$Bi_{10-14}X'_tO_n$$

wherein X' is a member selected from the group consisting of Ge, Si and $Ge_x\text{-}Si_y$; x and y are numerals, the sum of which is equal to one, and n is a numeral substantially equal to the stoichiometric amount of oxygen within the compound.

4. A dosimeter as defined in claim 1 wherein the crystalline bismuth oxide compound is $Bi_{12}GeO_{20}$.

5. A dosimeter as defined in claim 1 wherein the crystalline bismuth oxide compound is $Bi_{12}SiO_{20}$.

* * * * *